(12) United States Patent
Assenheimer

(10) Patent No.: US 6,193,282 B1
(45) Date of Patent: Feb. 27, 2001

(54) HOSE COUPLING AND METHOD OF MANUFACTURE

(75) Inventor: Kevin C. Assenheimer, Bucyrus, OH (US)

(73) Assignee: Dayco Products, Inc., Dayton, OH (US)

( * ) Notice: Subject to any disclaimer, the term of this patent is extended or adjusted under 35 U.S.C. 154(b) by 0 days.

(21) Appl. No.: 09/405,875

(22) Filed: Sep. 24, 1999

(51) Int. Cl.$^7$ .................................................. F16L 11/00
(52) U.S. Cl. .......................... 285/115; 285/114; 285/256; 138/135
(58) Field of Search .................................. 285/114, 115, 285/318, 244, 256; 138/110, 135, 136

(56) References Cited

U.S. PATENT DOCUMENTS

| | | | |
|---|---|---|---|
| 289,381 | * 12/1883 | Bodifield et al. | 285/114 |
| 739,097 | * 9/1903 | Marcy | 285/114 |
| 790,971 | 5/1905 | Nicholls. | |
| 858,575 | * 7/1907 | Claflin | 285/114 |
| 1,249,380 | * 12/1917 | Goodall et al. | 285/114 |
| 1,440,508 | * 1/1923 | Todd | 138/135 |
| 1,974,383 | * 9/1934 | Wallace | 138/135 |
| 2,066,473 | * 1/1937 | Jorgensen | 138/135 |
| 2,300,057 | * 10/1942 | Meyer | 285/114 |
| 3,112,937 | * 12/1963 | Williams | 285/114 |
| 3,333,871 | * 8/1967 | Abbiati et al. | 285/114 |
| 4,487,444 | * 12/1984 | Hensen | 285/114 |
| 5,036,890 | * 8/1991 | Whaley | 138/110 |
| 5,246,254 | * 9/1993 | LoJacono, Jr. et al. | 285/114 |

FOREIGN PATENT DOCUMENTS

| | | | |
|---|---|---|---|
| 203392 | * 7/1955 | (AU) | 285/114 |
| 690748 | * 5/1940 | (DE) | 285/114 |
| 1263653 | * 5/1961 | (FR) | 285/114 |

* cited by examiner

Primary Examiner—Eric K Nicholson
(74) Attorney, Agent, or Firm—Joseph V. Tassone

(57) ABSTRACT

A flexible elastomeric fluid conveying hose which includes a rigid coupling having a member extending partially into the hose body. A stress relief member, in the form of a helical spring, is mounted directly on the coupling member and also inserted into the body to prevent kinking or collapsing of the hose.

19 Claims, 2 Drawing Sheets

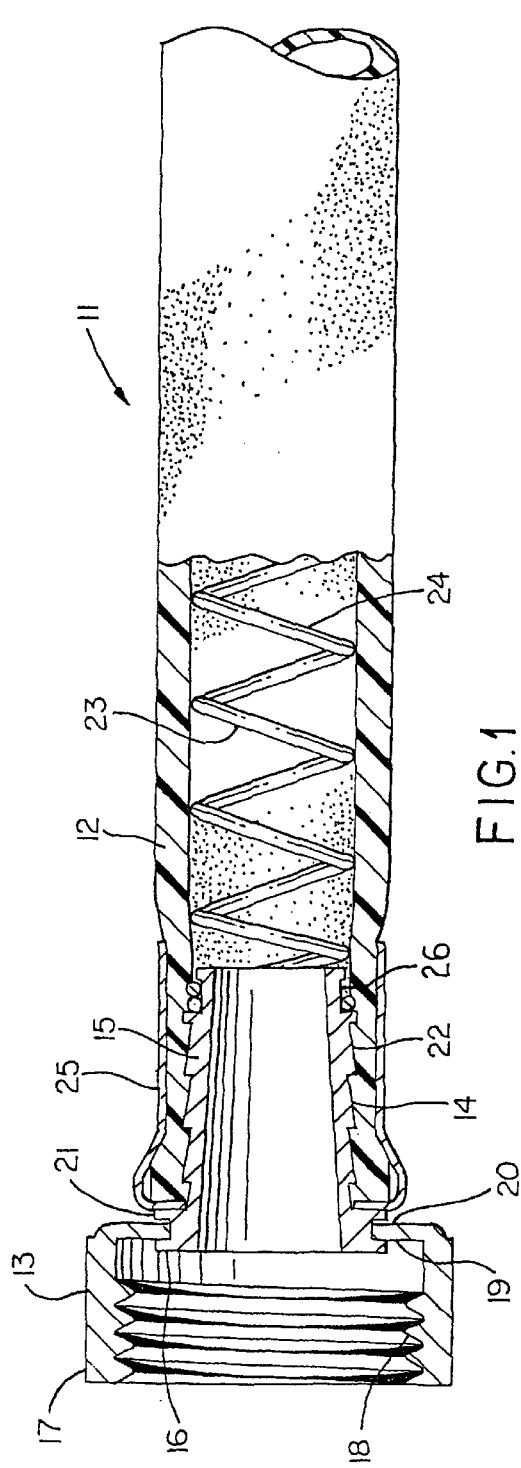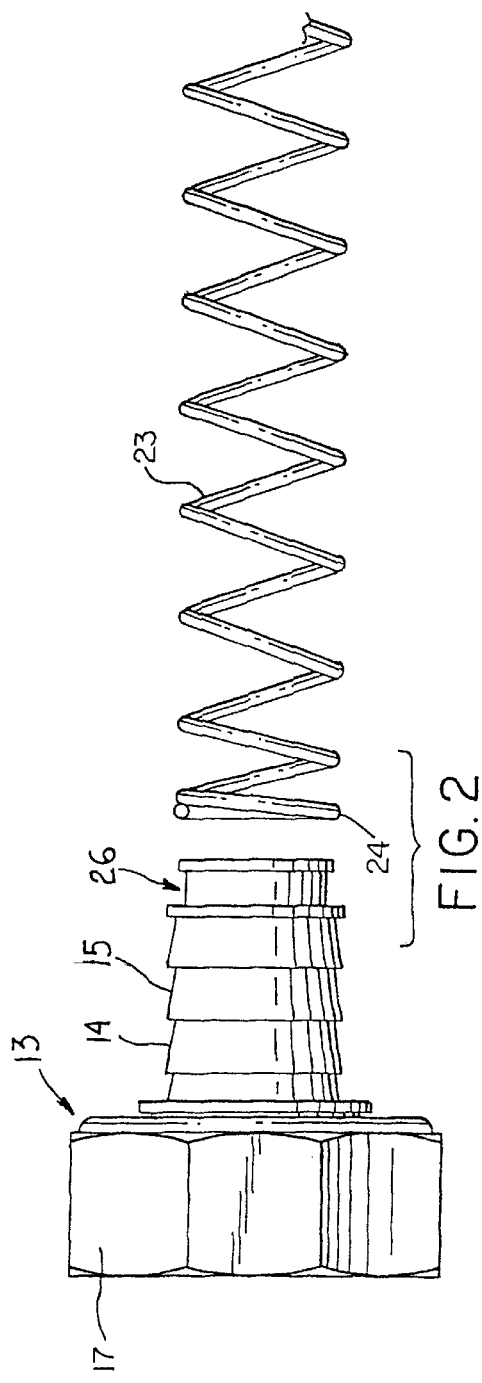

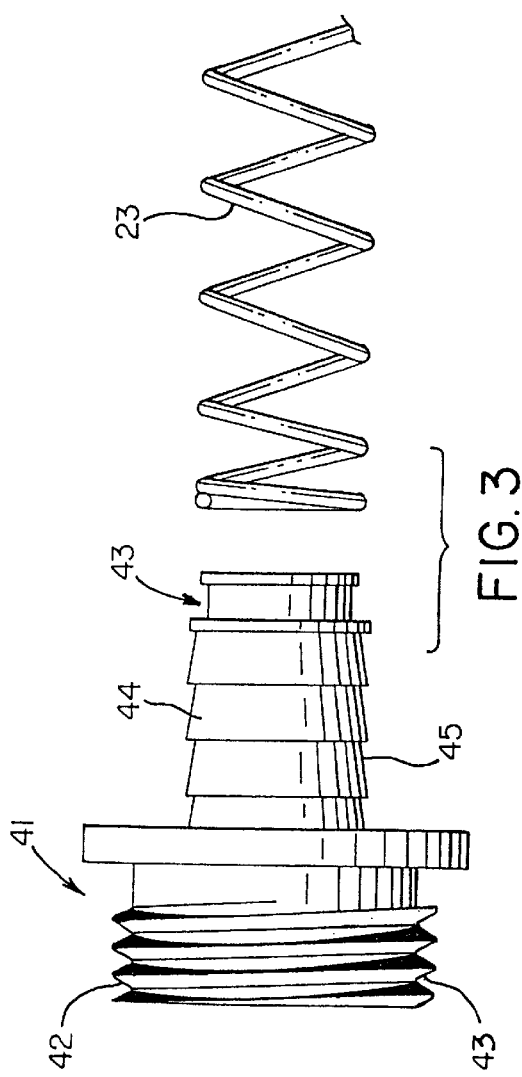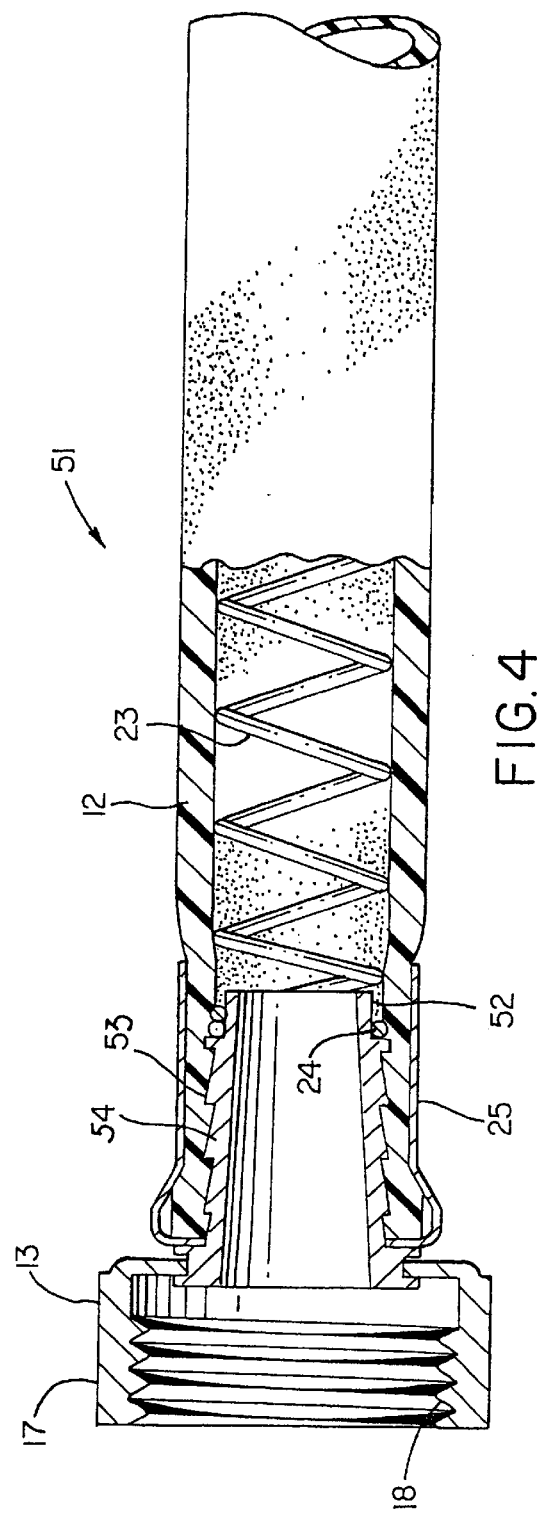

HOSE COUPLING AND METHOD OF MANUFACTURE

BACKGROUND OF THE INVENTION

1. Field of the Invention

The present invention relates to a hose coupling for incorporation into a flexible elastomeric fluid conveying hose, such as a garden hose or air hose. The coupling is designed to reduce stress on the end of the hose and eliminate kinking during use.

2. Prior Art Statement

Various designs have been used for the stress relief on hose ends, including designs which utilize a spring mounted on a washer that is inserted into the hose coupling, as shown in the patent to Hensen, U.S. Pat. No. 4,487,444. U.S. Pat. No. 790,971, issued to Nicholls, utilizes a spring extending inside a hose and secured to the inner surfaces thereof.

SUMMARY OF THE INVENTION

According to the present invention, stress relief of the hose coupling is provided by a helical spring having a constant diameter throughout its length, the spring being mounted on and secured directly to the outer surface of the ferrule which is an integral component of the coupling. The spring extends into at least a portion of the hose body just beyond the end of the ferrule and thus eliminates the stress and kinking which occurs when the end is bent. By securing the spring to the ferrule, the spring will be secured during bending so that it will not slip into the hose body. The construction may be used on both the male and female ends of a fluid conveying hose, such as a garden hose, an air brake hose, or an industrial air hose.

It is a principal object of this invention therefore, to provide a hose coupling that will eliminate stress on the end of the hose.

It is a further object to prevent kinking and collapsing of the hose end when it is bent during use.

It is another object to provide a member that is secured to the ferrule of the hose coupling.

It is still another object to utilize a helical spring as the stress relief member and secure it to the ferrule in a manner that will prevent it from becoming detached.

BRIEF DESCRIPTION OF THE DRAWINGS

FIG. 1 is a side view in partial section of a hose with the novel coupling.

FIG. 2 is an exploded view of the coupling and spring reinforcement.

FIG. 3 is a view similar to FIG. 2 of a different coupling and spring reinforcement.

FIG. 4 is a view similar to FIG. 1 illustrating a modified form of hose.

DESCRIPTION OF PREFERRED EMBODIMENTS

Referring to FIG. 1, reference numeral 11 illustrates a flexible hose having a hose body 12 made of an elastomeric material such as rubber. The hose shown is a garden hose which is not reinforced, but other types of fluid conducting hoses, both reinforced and non-reinforced are contemplated as being within the scope of the present invention. Such hoses may conduct air, such as for air brakes or industrial uses. The hose 11 comprises a coupling 13, preferably made of a metal such as brass or steel, having a ferrule 14 which is a generally cylindrical member and consists of a tubular shaft 15 which terminates in an enlarged outer end 16. A collar 17 with internal threads 18 is freely rotatable, and acts as a female coupling to engage a mating male member, such as a hose faucet. The collar is secured to the ferrule by causing the surface 19 to engage the outer end 16 while surface 20 engages a spaced ring member 21 of the ferrule. The shaft 15 has spaced annular rings 22. The stress relief member is a helical spring 23 having spaced coils 24 which are of a constant diameter throughout the length of the spring. The coils may have a circular cross-section as shown, or may be a so-called "flat spring", meaning that the coils are rectangular in cross-section. The spring coils may be made of metal or plastic, as is well known in the art. One or more of the end coils are mounted on and retained by the outer surface of the shaft 15 of the ferrule by various methods known in the art, such as crimping. The coupling assembly is inserted into the hose body 12 so that the shaft 15 and the spring 23 extend into the hose body; as shown in FIG. 1, the coils of the spring are inserted into the interior of the hose body so that the contact the smooth inner surface thereof, and crimped into place by an outer rigid sleeve 25 which compresses the hose body and compressing the body around the shaft. This pressure also causes the spring 23 to be secured around the shaft. As better shown in FIGS. 2 and 3, the end coils 24 are placed in a groove 26. Only one or two of these end coils are retained in the groove 26, which is sufficient to secure the spring. The spring extends just beyond the inner end of the ferrule and is preferably between 4 and 7 times in length compared to the length of the ferrule 14, in order to obtain the best results.

FIG. 2 is an exploded view which illustrates a preferred means for retaining one or more coils of the spring on the hose coupling, showing in greater detail the shaft 15 of ferrule 14 with its groove 26 extending into and around the outer surface of the shaft. One or more coils 24 of the spring 23 are snapped into this groove for locking them into place. This arrangement may be used as the sole retaining means for the coils, or may be used to supplement the crimping of the coils referred to above. Any of these arrangements are important because they prevent the spring from slipping down into the hose body and thus causing the spring to lose its effectiveness in stress or stain relief.

FIG. 3 is an exploded view of a hose coupling 41 which is constructed like coupling 13 except that instead of having a rotatable female collar it has a fixed male collar 42 with external threads 43 designed to engage a member similar to collar 17 which may be found, for example, on a hose nozzle. The end coils 24 are secured to the outer surface of the shaft 15 in the same manner as in coupling 13 by placing them in groove 43 in a manner similar to the arrangement described above, and the shaft 44 of ferrule 45 and retained spring are similarly inserted in the hose body.

FIG. 4 is a view similar to FIG. 1 which illustrates a hose 51 identical to hose 11 except that instead of the groove 26 at the end of the ferrule 54, the end 52 of the shaft 53 is straight. This illustrates the earlier-referred to concept of retaining the spring without the use of the groove to secure the end coils of the spring. Instead, the crimping may secure these end coils to the end 52 by use of the pressure exerted radially inward by the crimping mechanism.

It should be noted that the couplings shown above are primarily designed for garden hose, but if the inventive concept is to be utilized for air hose, air brake hose, or the like, necessary modifications are contemplated to accommodate these systems.

The above embodiments are merely exemplary, and other embodiments are contemplated as being within the spirit of the invention.

What is claimed is:

1. In a flexible fluid conveying elastomeric hose having smooth inner and outer annular surfaces and a rigid coupling having a generally cylindrical member inserted into at least one end of said hose; the improvement comprising retaining means formed on said inserted end of said member, reinforcing means comprising a helical spring having a plurality of coils inserted into the interior of said hose just beyond said inserted end of said member and contacting said smooth inner surface of said hose, said retaining means comprising a single right circular annular groove extending into and around the outer surface of said inserted end of said member for securing end coils of said spring, said groove defined by outwardly extending right circular parallel walls perpendicular to said end and being the sole means for retaining said end coils within said groove, and means for compressing said hose around said end coils and against said retaining means to provide stress relief at said at least one end of said hose to avoid kinking and collapsing thereof.

2. The hose of claim 1 wherein said reinforcing means is a helical spring.

3. The hose of claim 2 wherein said spring is made of metal.

4. The hose of claim 2 wherein said spring is made of plastic.

5. The hose of claim 2 wherein said spring has spaced coils of a constant diameter throughout its length.

6. The hose of claim 1 wherein said compressing means comprises a rigid sleeve surrounding said at least one end of said hose.

7. The hose of claim 1 wherein said at least one of said coils is crimped around said member.

8. The hose of claim 1 wherein said reinforcing means has a length which is between 4 and 7 times the length of said member.

9. The hose of claim 1 wherein said fluid is water utilized for watering gardens.

10. The hose of claim 1 wherein said fluid is air utilized for industrial and automotive purposes.

11. In a flexible fluid conveying elastomeric hose having smooth inner and outer surfaces, a rigid coupling having a generally cylindrical member adapted to be inserted into at least one end of said hose; the improvement comprising retaining means formed on said inserted end of said member, reinforcing means comprising a helical spring having a plurality Of coils adapted to be inserted into the interior of said hose just beyond said inserted end of said member and contacting said smooth inner surface of said hose, said retaining means comprising a single right circular annular groove extending into and around the outer surface of said inserted end of said member for securing end coils of said spring, said groove defined by outwardly extending right circular parallel walls perpendicular to said end and being the sole means for retaining said end coils within said groove, and means for compressing said hose around said end coils and against said retaining means to provide stress relief at said at least one end of said hose to avoid kinking and collapsing thereof.

12. The coupling of claim 11 wherein said retaining means secure no more than two of said end coils.

13. The coupling of claim 12 wherein said spring has coils of a constant diameter throughout its length.

14. The coupling of claim 11 wherein at least one of said coils is crimped around said member.

15. The coupling of claim 11 wherein said reinforcing means has a length which is between 4 and 7 times the length of said member.

16. In a method of forming a flexible fluid conveying elastomeric hose having smooth inner and outer annular surfaces and a rigid coupling having a generally cylindrical member inserted into at least one end of said hose; the improvement comprising the steps of forming retaining means in the form of a single right circular annular groove extending into and around said inserted end of said member, and forming outwardly extending parallel right circular walls perpendicular to said end for defining said groove, forming a reinforcing means comprising a helical spring having a plurality of coils, inserting said spring into the interior of said hose just beyond said inserted end of said member and contacting said smooth inner surface of said hose, and securing end coils of said spring within said groove and retaining said coils between said walls, and compressing said hose around said end coils and against said retaining means to provide stress relief at said at least one end of said hose to avoid kinking and collapsing thereof.

17. The method of claim 16 comprising the further step of securing not more than two of said end coils.

18. The method of claim 17 comprising the further step of forming said spring with coils of a constant diameter throughout its length.

19. The method of claim 16 comprising the further step of crimping said at least one of said coils around said member.

* * * * *